J. L. OSGOOD.
HOSE COUPLING.
APPLICATION FILED OCT. 30, 1913.
1,241,654.
Patented Oct. 2, 1917.
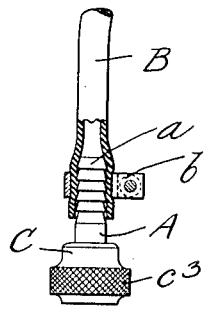
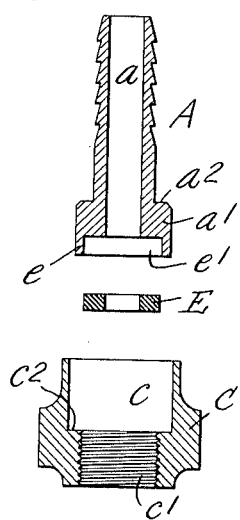
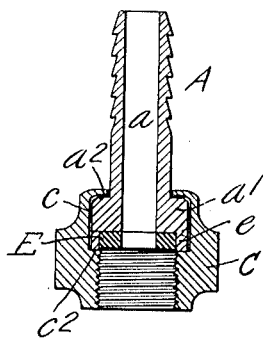
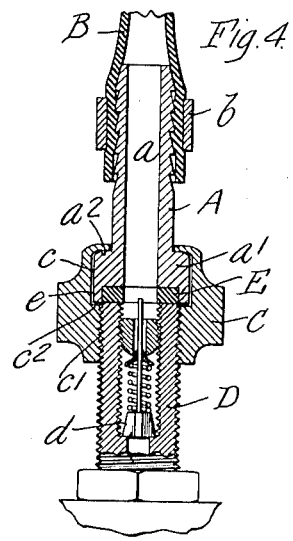
Witnesses
A. G. Dimond.
J. A. Noe.
Inventor.
John L. Osgood.
By Wilhelm & Parker.
Attorneys.

UNITED STATES PATENT OFFICE.

JOHN L. OSGOOD, OF BUFFALO, NEW YORK.

HOSE-COUPLING.

1,241,654.  Specification of Letters Patent.  Patented Oct. 2, 1917.

Application filed October 30, 1913. Serial No. 798,200.

*To all whom it may concern:*

Be it known that I, JOHN L. OSGOOD, a citizen of the United States, residing at Buffalo, in the county of Erie and State of New York, have invented a new and useful Improvement in Hose-Couplings, of which the following is a specification.

This invention relates to hose connectors or couplings and especially to small couplings such as used for connecting the flexible tubes of air pumps to the inflating valve stems of pneumatic tires.

Connectors or couplings of this kind generally consist of a nipple or member to which the end of the hose or tube is secured, a rotatable member or nut which is swiveled to the nipple and adapted to be screwed onto the part or member to which it is desired to attach the hose, and a washer or packing gasket to give a fluid tight joint between the nipple and the part to which the hose is to be attached. This washer, which is made of yielding or compressible material, readily wears out and in connectors of this kind heretofore made the wearing out of the washer renders the connector useless.

The objects of this invention are to produce a connector of the kind described which is so constructed as to reduce to the minimum the cutting or wearing out of the washer; also to so construct the connector that the washer can be removed when worn out and replaced by another; also to so construct the connector as to reduce the cost of making the same.

In the accompanying drawings:

Figure 1 is an elevation of a connector secured on the end of a hose or tube.

Fig. 2 is an enlarged sectional elevation of the parts comprising the connector, detached from each other.

Fig. 3 is an enlarged sectional elevation of the connector showing the parts assembled.

Fig. 4 is a central sectional elevation thereof showing the connector secured on a valve stem of a pneumatic tire and having a hose or tube connected therewith.

A represents the tubular nipple of a hose connector which comprises a tubular shank $a$ and an enlarged portion or head $a'$ integral with the shank and forming an annular shoulder $a^2$ therewith. The shank is adapted to be inserted into a tube or hose B which is secured thereon by any suitable means, such as a clamp $b$.

The head $a'$ of the nipple is confined in a recess or cavity $c$ of a hollow coupling member or nut C which is adapted to turn on the nipple. This member has an internally threaded hole $c'$ extending through it and terminating in the cavity $c$, forming a shoulder $c^2$ with the bottom wall of the cavity. The coupling member preferably has a knurled exterior surface $c^3$ which facilitates the turning of the coupling member. The upper edges of the coupling member are turned inwardly over the shoulder $a^2$ of the nipple and thus retain the member on the head of the nipple in such a manner as to permit the coupling member to turn freely on the nipple. In Fig. 4 the connector is shown as applied to an inflating valve stem D of the kind commonly used on pneumatic tires and which contains a check valve $d$. All of these parts may be of any suitable or usual construction.

In order to form an air-tight joint between the nipple A and the valve stem D, an annular washer E of suitable yielding or compressible material is provided. This washer is surrounded by an incompressible or rigid annular wall or ring $e$, which bears against the shoulder $c^2$ of the coupling member. Preferably this wall or ring $e$ is an integral part of the head of the nipple, forming a depression $e'$ therein in which the washer is confined and in which it is held by frictional contact with the wall or ring $e$.

In connectors of this kind as heretofore made, the washers were substantially of the same diameter as the cavity $c$ in the coupling member, which causes a tendency for the washer to turn with the coupling member relatively to the nipple and valve stem, thereby cutting or wearing the washer by reason of the abrasion of the same against the nipple and stem when securing the connector on the valve stem. By confining the washer in the depression of the nipple, the washer is held from turning with the coupling member and is simply compressed between the nipple and the valve stem and is therefore not cut or worn by abrasive action against these parts and the expansion of the washer laterally owing to the pressure thereon of the nipple and the valve stem, will be prevented. Consequently the turning of the coupling member is not in any way resisted or frictionally opposed by the bearing of the edges of the compressed washer against the same, so that the placing of the coupling member on a valve is greatly facilitated. Furthermore, the wall or ring $e$ bearing against the shoulder $c^2$ of the coupling member prevents this shoulder from engaging and wearing the washer. The washer is preferably made slightly larger in diameter than the internal diameter of the threaded hole $c'$ of the coupling member so that it cannot fall out but so that an old washer can be screwed out and a new one screwed in through the threaded hole of the coupling into the seat in the nipple. This adds greatly to the life and usefulness of the connector as compared with the connectors heretofore made, which were rendered useless by the wearing out of the washers.

Another important advantage of the construction described is that the connector can be manufactured more economically and with greater precision. This is due to the fact that the heads $a$ of the nipples A can all be made accurately to the same gage, and when the walls of the coupling member are turned over to the same extent to confine the heads $a$ within the cavities a corresponding fit will be had in all of the connectors, thus insuring the free movement of the coupling members without binding and without undue looseness. This can not be done in the connectors heretofore made in which the washer extends over the shoulder of the coupling member, since the space occupied in the cavity in the coupling member by the head of the nipple and the washer is variable owing to variations in the thickness of the washers, and the wall of the cavity of each coupling member is therefore turned over a distance depending upon the combined thickness of the head of the nipple and the washer, which varies considerably and which consequently requires careful work and individual attention to each connector and results in the spoiling of a large number of connectors. If a washer happens to be thicker than normal it will be compressed between the end of the nipple and the shoulder of the coupling member and prevent the latter from turning or cause it to bind. By means of the construction shown, the walls of the coupling member can be all turned over to the same extent by spinning the same to gage in a lathe or machine tool and thus when the lathe or other machine is once set to spin the walls over to the proper extent no more skill is required since each wall is spun over to the same distance.

I claim as my invention:

In a hose coupling, the combination of a nipple having a passage extending lengthwise thereof and provided with a head, a coupling member having a cavity in which said head is held and adapted to turn relatively to said head, said member having a threaded passage connecting with the passage in said nipple, a rigid ring in said recess adjacent to said threaded passage and forming a bearing between said nipple and said coupling member, the internal diameter of said ring being greater than the diameter of said passage in the coupling member, and a packing washer removably arranged in said ring and held against radial expansion thereby and yieldingly retained in position in said ring by the threads in the passage in said coupling member, said ring holding said washer against contact with said coupling member.

Witness my hand, this 28th day of October, 1913.

JOHN L. OSGOOD.

Witnesses.
C. W. PARKER,
A. L. McGEE.